United States Patent [19]

Goodridge

[11] Patent Number: 4,805,942
[45] Date of Patent: Feb. 21, 1989

[54] FIELD ATTACHABLE AND REUSABLE HOSE END FITTING FOR CONVOLUTED END

[76] Inventor: Stuart Goodridge, Collins Road, Totnes, Devon T09 5PJ, England

[21] Appl. No.: 88,813
[22] Filed: Aug. 24, 1987
[51] Int. Cl.[4] .............................. F16L 39/02
[52] U.S. Cl. ..................... 285/149; 285/179
[58] Field of Search ................... 285/149, 903

[56] References Cited

U.S. PATENT DOCUMENTS

| | | | |
|---|---|---|---|
| 2,112,238 | 3/1938 | Guarnaschelli | 285/149 |
| 2,833,567 | 5/1958 | Bacher et al. | 285/149 X |
| 2,848,254 | 8/1958 | Millar | 285/149 |
| 3,023,496 | 3/1962 | Millar | 285/149 X |
| 3,083,989 | 4/1963 | Press | 285/149 X |
| 3,675,951 | 7/1972 | Morin | 285/149 X |
| 3,820,825 | 6/1974 | Morin | 285/149 X |
| 4,109,943 | 8/1978 | Cooke | 285/149 |

Primary Examiner—Thomas F. Callaghan
Attorney, Agent, or Firm—Poms, Smith, Lande & Rose

[57] ABSTRACT

A field attachable and reusable hose end fitting for convoluted hose. The fitting includes a collar having threads thereon threadable to a convoluted hose end. The same collar has a smooth bore portion encircling the terminal end of the corrugated hose when the collar is threaded thereon. When the nipple of the fitting is inserted into the hose end and the socket of the fitting is threaded to the nipple, the corrugations of the hose are crushed between the inner smooth bore of the collar and the outer surface of the nipple forming a fluid tight seal.

1 Claim, 2 Drawing Sheets

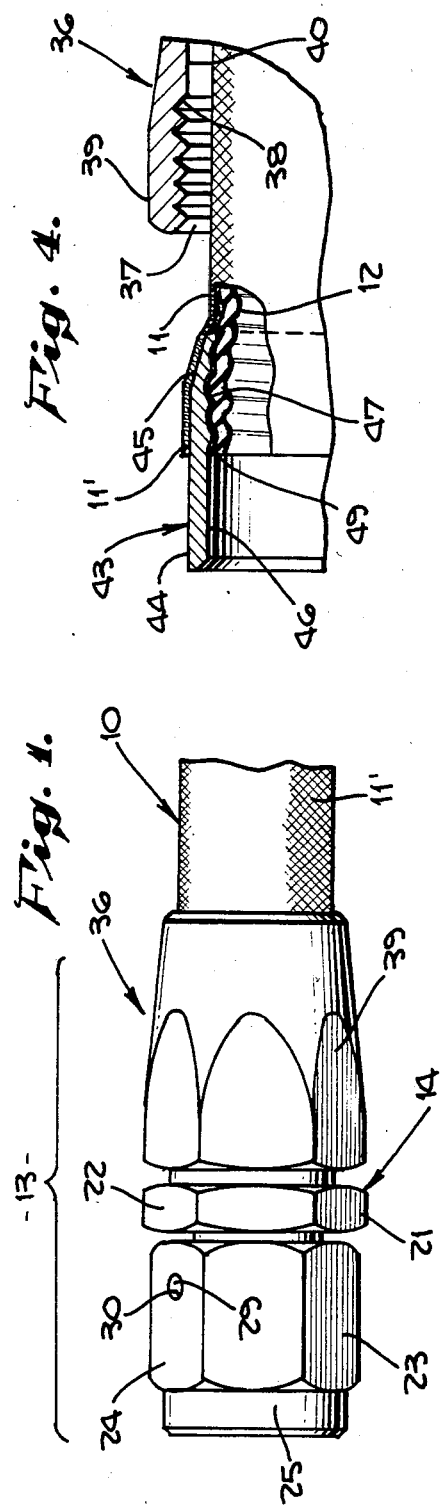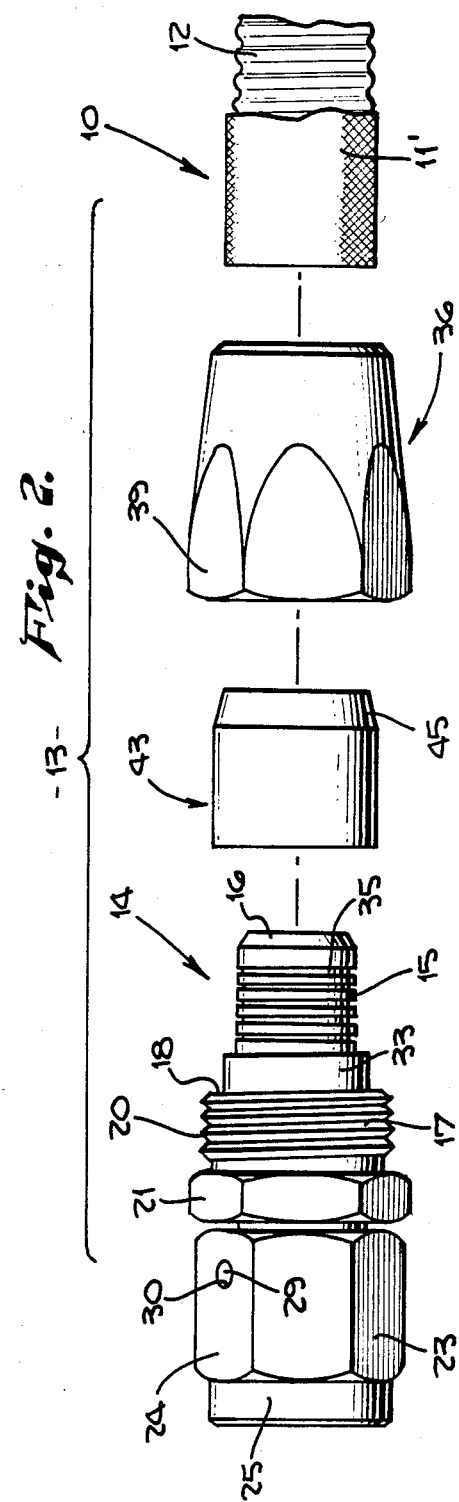

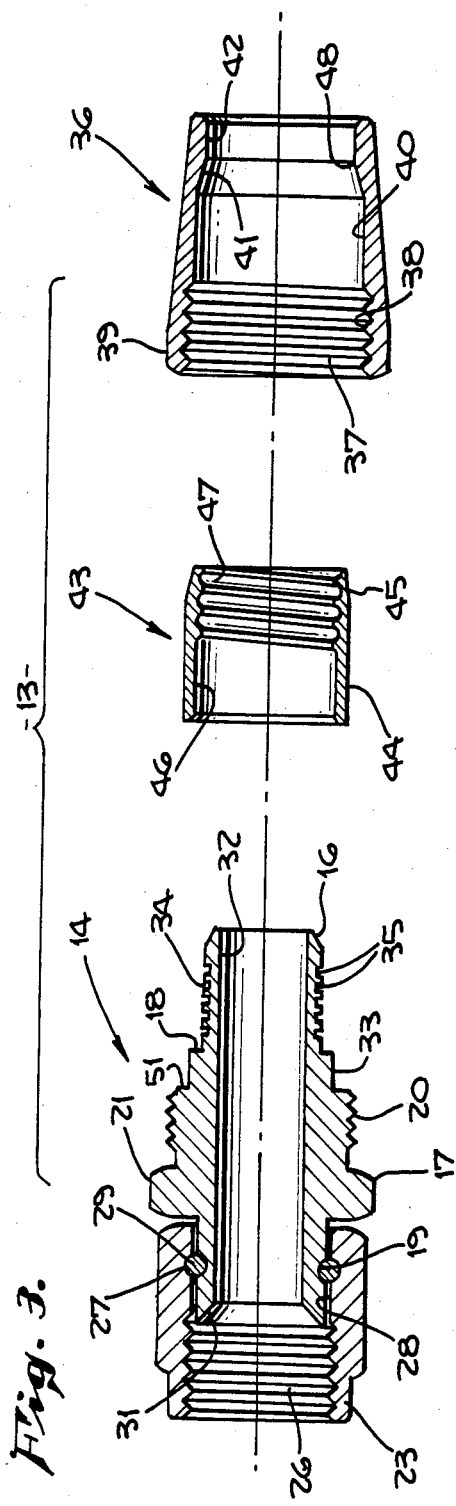

FIELD ATTACHABLE AND REUSABLE HOSE END FITTING FOR CONVOLUTED END

BACKGROUND OF THE INVENTION

1. Field of the Invention

The invention relates to hose assemblies; and, more particularly, to a field attachable and reusable hose end fitting for corrugated hose.

2. Description of the Prior Art

When it is desired to use hose assemblies out in the field to connect up various fluid conduits, hose end fittings must be crimped to the connecting hose segments in a fluid tight manner. The operator either buys such pre-crimped assemblies in pre-selected lengths and configurations or buys an expensive crimping machine to crimp the desired length and configuration hose assembly. Thus, there is not only a need to have the required length in inventory but man-hours are required to carry out the foregoing operations.

In addition, crimp-type fittings have high rejection rates since it is a difficult seal to create. The fitting may not be sealing properly and uniformly about the periphery of the crimped hose due to the nature of the hose itself.

For example, corrugated hose is quite desirable since the corrugations prevent collapsing of the hose and such corrugations make the hose more flexible and bendable. Straight extruded hose, such as Teflon hose, is inflexible in bendability and may collapse. Corrugated tubing is generally made of an inner liner of a Teflon material coated in black on the interior thereof with an outer covering of a fiberglass material. A flexible sheath of material, such as a Nomex coating, covers the convoluted Teflon hose section. The foregoing is commonly referred to as convoluted Teflon hose and one type available to the art is manufactured and sold by Titeflex Co. of Massachusetts.

Thus, there is a need for a field attachable and reusable fitting assembly for corrugated hose.

SUMMARY OF THE INVENTION

It is an object of this invention to provide a field attachable and reusable fitting assembly for corrugated hose.

It is a further object of this invention to provide such an assembly which creates a fluid tight seal to corrugated hose without crimping of the same.

It is still another object of this invention to provide such an assembly which can be quickly and easily attached to pieces of corrugated hose cut to the desired length.

It is a further object of this invention to provide Q such a fitting which has either a straight or elbow fitting.

These and other objects are preferably accomplished by providing a fitting having a collar with threads thereon threadable to a convoluted hose end. The same collar has a smooth bore portion encircling the terminal end, of the corrugated hose when the collar is threaded thereon. When the nipple of the fitting is inserted into the hose end and the socket of the fitting is threaded to the nipple, the corrugations of the hose are crushed between the inner smooth bore of the collar and the outer surface of the nipple forming a fluid tight seal.

BRIEF DESCRIPTION OF THE DRAWING

FIG. 1 is a vertical view of a section of a hose having a fitting assembly in accordance with the teachings of the at one end thereof;

FIG. 2 is an exploded view of the hose section and assembly of FIG. 1;

FIG. 3 is an exploded sectional view of the fitting assembly along of FIGS. 1 and 2;

FIG. 4 is a partial cross-sectional view illustrating a step in the connection of a portion of the fitting assembly of FIGS. 1 to 3 to a hose section;

FIG. 5 further step in the connection of the fitting assembly of FIGS. 1 to 3 to a hose section; and FIG. 6 is a view similar to a portion of the exploded view of FIG. 3 showing a modification thereof.

DESCRIPTION OF THE PREFERRED EMBODIMENT

Referring now to FIG. 1 of the drawings, a hose section 10 is shown having an outer flexible sheath 11' (see FIG. 2), an inner fluid sealing corrugated tubing 12 of a synthetic plastic material or the element like and a fiberglass coating 11 over the inner tubing 12. A fitting assembly 13 is secured to one end of hose section 10. Fitting assembly 13 includes a nipple 14 of generally cylindrical construction including an elongated substantially cylindrical nipple portion 15 terminating at tapered end 16. Nipple 14 further includes an integral enlarged portion 17 having an outer diameter greater than the outer diameter of cylindrical portion 15 with the same internal diameter (FIG. 3). A shoulder 18 is provided at the intersection of portions 15 and 17. An annular recess 19 (FIG. 3) is provided on portion 17 for receiving a connecting wire therein as will be discussed. External threads 20 are provided on the exterior of portion 17 and an enlarged nut 21 having hexagonal flats 22 (FIG. 1) thereon is integral with portion 17.

A coupling member 23 is coupled to nipple 14 and includes hexagonal flats 24 (FIGS. 1 and 2) on its outer surface and an integral smooth walled terminal cylindrical portion 25. Member 23 is internally threaded at threads 26 (FIG. 3) and includes an annular recess 27 on its inner smooth wall 28 receiving therein and in recess 19 an annular connector wire 29 terminating out of opening 30 (FIGS. 1 and 2) in member 23 as is well known in the art for retaining coupling member 23 to nipple 14. A tapered inner smooth walled portion 31 extends from the inner smooth wall portion or bore 32 of nipple 14 to threads 26. In this manner, coupling member 23 swivels or rotates with respect to nipple 14 and can be coupled, via threads 26, to a threaded connection.

Nipple 14 further includes a cylindrical portion 33 between threads 20 and nipple portion 34 of nipple 14. A plurality of annular spaced ridges 35 are provided on nipple portion 34 between cylindrical portion 33 and tapered end 16.

Fitting assembly 13 further includes a socket 36 (FIG. 3) having a forward internally threaded section 37 including threads 38 for mating engagement with threads 20 of nipple 14. The exterior surface of the forward internally threaded section 37 forms a conventional hexagonal nut surface 39 (see FIG. 2) so that the socket 36 may be tightened relative to nipple 14. The socket 36 further includes an intermediate internal smooth walled cylindrical section 40 extending from threaded section 37 tapering upwardly at tapered portion 41 to a terminal smooth walled cylindrical section 42.

As particularly contemplated in the present invention, a hose threading collar member 43 is provided between socket 36 and nipple 14. Collar member 43 has a main generally cylindrical body portion 44 terminating in a tapered nose portion 45. The interior of collar member 43 is smooth walled along a substantial portion thereof, as at smooth wall bore 46, with threads 47 adjacent the tapered nose portion 45. As seen in FIG. 3, the threads 47 extend from tapered nose portion 45 along the inner wall of collar member 43 a substantial distance into the interior of the cylindrical body portion 44. As will be discussed, the outer diameter of cylindrical portion 44 is slightly less than the inner diameter of the interior threaded portion 37 and smooth bore 40 of socket 36; the tapered portion 45 of collar member 43 is generally related to the inner tapered section 41 of socket 36, the intersection 48 (FIG. 3), of tapered section 41 and cylindrical section 42 acting as a stop for collar member 43 as will be discussed.

In operation, socket 36 is inserted onto hose section 10 (for example, as seen in FIG. 4) with convoluted tubing 12 exposed at one end 49 thereof, the threaded section 37 facing in the direction of end 49. Collar member 43 is now threaded onto the convoluted end 49 of tubing 12 until the terminal end 49 is at a point near the terminal end 50 of collar member 33 (FIG. 5). The nipple portion 34 is now inserted into the interior of tubing 12 until shoulder 51 (at the intersection of cylindrical portion 33 and nipple portion 34) abuts against the terminal end 49 of tubing 12.

Socket 36 is now moved to a thread engaging position with respect to nipple 14 and rotated thereon thereby threading threads 20 into threaded section 37 using nuts 21 and 39 to facilitate the threading thereof. This draws up collar member 43 so that the terminal end 50 thereof abuts against shoulder 18 of the threads 20. This is the final installed position shown in FIG. 1.

The other end of hose section 10 may be provided with a similar fitting assembly 13. Alternatively, an elbow-type fitting may be used as seen in FIG. 6. Thus, nipple portion 52 is integral with a cylindrical portion 53 (similar to portion 33 of the embodiment of FIGS. 1 to 5) extending from integral threaded portion 54 spaced from an integral nut portion 55 having flats 56 thereabout. An integral curved elbow portion 57 extends from nut portion 55 and terminates in an integral tapered nipple portion 58. A coupling member 59, similar to coupling member 23 of the embodiment of FIGS. 1 to 5, is rotatably mounted to nipple portion 58. Coupling member 59 includes flats 59' on the exterior thereof identical to flats 24 of coupling member 23 and threads 60 on the interior thereof. An annular recess 61 is provided on the inner wall 62 of coupling member 59 and a like mating annular recess 63 is provided on the exterior wall 64 of tapered nipple portion 58. A wire 65 is disposed in mating recesses 61, 63 and terminates at an opening 65' in coupling member 59 identical to opening 30 shown in FIG. 1. Thus, coupling member 59 rotates about nipple portion 58.

The elongated nipple portion 52 terminates at a tapered end 66 and has a plurality of spaced annular ridges 67 identical to ridges 35 of the embodiment of FIGS. 1 to 5. A throughbore 68 extends through elongated nipple portion 52 and elbow portion 57 integral therewith opening at tapered nipple portion 58 and also communicating with the threaded opening 60 in coupling member 59.

Thus, coupling member 59 and the integral nipple portion 52 and elbow portion 57 can swivel or rotate so that any hose connected thereto can be oriented in any way desired.

The assembly of the nipple portion 52 and the parts integral therewith to a corrugated hose section is identical to that discussed in accordance with the embodiment of FIGS. 1 to 5. Thus, no further discussion is deemed necessary.

The collar member 43 is threaded over the convolutions of hose section 10 gripping the same but threaded to hose section 10 only along thread 47. That is, collar member 43 is threaded all the way onto the hose end but the threads 47 thereof only grip hose section 10 one-half way or so along the threaded section 47 alone of collar member 43 (and not along the smooth bored section 46). When the cylindrical nipple portion 15 of nipple 14 is inserted into the open end of hose section 10 (the smooth bored section 46 of collar member 43 surrounding the same), this area of hose section 10 not covered by threads is compressed linearly along the longitudinal axis of hose section 10 as nipple 14 is threaded to socket 36 as heretofore disclosed. As these corrugated portions of hose section 10 are compressed, they widen radially to create a seal between the nipple outer surface and the unthreaded or smooth bored collar member inner surface.

The fitting assembly 13 disclosed herein can be quickly and easily attached in the field and is reusable. In today's field operations, one either buys hose sections with fittings pre-crimped thereon or needs expensive apparatus to crimp the same. Obviously, such pre-crimped assemblies must be in given lengths. This creates a problem since the field operator may not have the length needed and, of course, must carry sufficient inventory to cover all desired lengths.

Thus, a field attachable fitting that can be attached to corrugated hose greatly reduces inventory and readily accommodates to any desired length. Preexisting corrugated hose can be easily cut to any length desired. Pre-crimped assemblies must be maintained in differing configurations, bends, etc.

Further, as heretofore discussed, crimp-type fittings have high rejection rates and are difficult to create a seal. That is, such a seal may not be sealing properly and uniformly about the periphery of the crimped hose due to the nature of the hose itself.

It can be seen that I have disclosed a fitting having a nipple and collar for sealing the same to a corrugated hose. The nipple is held to the socket by mating threads and crushing of the hose between the collar and the nipple results in a leak proof seal. The fitting is reusable and can be assembled in the field. Inventory of parts is reduced although a particular type of fitting assembly is disclosed, other variations may occur to an artisan and the invention is to be limited only by the scope of the appended claims.

I claim:

1. A hose and fitting assembly for corrugated hose of a synthetic plastic material comprising:

a hose having an outer flexible sheath, an inner fluid sealing corrugated tubing of a synthetic plastic material and a fiberglass coating between the sheath and the tubing, said hose terminating in a free end;

a nipple having a first elongated substantially cylindrical portion with a plurality of spaced ridges on the outer surface thereof received inside of the hose, a second substantially cylindrical portion of an outer diameter greater than the other diameter of said first cylindrical portion integral with said first cylindrical portion, and a threaded portion on said nipple adjacent said second cylindrical portion of larger diameter than said second cylindrical portion, said first and second cylindrical portion and said threaded portion being a single integral piece, wrench flats integral with said threaded portion of said nipple and of an outer diameter substantially greater than the outer diameter of said nipple threaded portion, and a coupling member with a plurality of spaced flats on the outer surface thereof having a threaded portion on the interior thereof rotatably connected to said nipple;

a collar member having an inner diameter substantially the same as the outer diameter of said hose with a generally cylindrical smooth outer surface, said collar member having a threaded portion on the interior thereof threadably receivable on the free end of said hose and threaded over said coating and said tubing with said coating abutting against said threaded portion of said collar member, said collar member also having a smooth inner bore adjacent the threaded portion of said collar member receivable over the free end of said hose when said collar member is threaded substantially all the way on to the free end of said hose, said hose abutting against the intersection of said first and second nipple cylindrical portions, said collar member having a tapered surface on the exterior thereof extending in direction away from said threaded portion and remote therefrom, said first cylindrical portion of said nipple being at least as long in overall length as both the length of said threaded portion of said collar member and a substantial portion of the length of the smooth inner bore of said collar member, said collar member having a forward end abutting against the intersection of said nipple threaded portion and said second cylindrical portion; and a socket having an internally threaded section adjacent one end thereof of an outer diameter related to the outer diameter of the threaded portion of said nipple and threaded onto said nipple threaded portion, said socket having a plurality of spaced flats on the outer surface thereof and a generally linear intermediate section adjacent the threaded section thereof being generally smooth walled and of an inner diameter related to the outer diameter of said collar member, said sheath being disposed between the interior of said socket and the exterior of said collar member, a terminal generally cylindrical section on said socket being generally smooth walled on the interior thereof and of an inner diameter less than the inner diameter of said intermediate section, a tapered section on said socket being generally smooth walled on the interior thereof and connecting said intermediate section to said socket cylindrical section, said tapered section having a taper substantially conforming to the tapered surface of said collar member whereby, with said member threaded onto the free end of said hose, said socket encircles said collar member and is threaded to said nipple, the corrugations of said hose are compressed linearly along the longitudinally axis thereof with the terminal free end of said hose compressing directly against the intersection of said nipple first and second cylindrical portions widening radially creating a seal between the nipple outer surface and the smooth bored inner surface of said collar member so that fluid cannot flow therepast.

* * * * *